(12) United States Patent
Strumolo et al.

(10) Patent No.: US 6,250,766 B1
(45) Date of Patent: Jun. 26, 2001

(54) VEHICLE IMAGE ACQUISITION AND DISPLAY ASSEMBLY

(75) Inventors: Gary S. Strumolo, Beverly Hills; Ronald H. Miller, Saline, both of MI (US)

(73) Assignee: Ford Global Tech.Inc, Dearborn, MI (US)

( * ) Notice: Subject to any disclaimer, the term of this patent is extended or adjusted under 35 U.S.C. 154(b) by 0 days.

(21) Appl. No.: 09/452,971

(22) Filed: Dec. 2, 1999

(51) Int. Cl.[7] ........................................................ G02B 5/08
(52) U.S. Cl. ........................... 359/857; 359/856; 359/865; 359/871; 359/872
(58) Field of Search ................................... 359/857, 856, 359/865, 871, 872

(56) References Cited

U.S. PATENT DOCUMENTS

| | | |
|---|---|---|
| 2,374,956 | 5/1945 | Rubissow . |
| 2,398,354 | 4/1946 | Brinkley . |
| 2,796,003 | 6/1957 | Kaufman . |
| 3,762,802 | 10/1973 | Allen . |
| 3,784,288 | 1/1974 | Toy . |
| 3,950,081 | 4/1976 | Yamashita et al. . |
| 3,979,158 | 9/1976 | Yamashita et al. . |
| 4,268,120 * | 5/1981 | Jitsumori ............................... 359/871 |
| 4,375,316 * | 3/1983 | Vantine ................................. 359/871 |
| 4,439,013 | 3/1984 | Hagn et al. . |
| 4,441,790 | 4/1984 | Williams et al. . |
| 4,685,779 | 8/1987 | Gonzalez . |
| 5,066,112 * | 11/1991 | Lynam et al. ......................... 359/267 |
| 5,280,391 | 1/1994 | Peinovich . |
| 5,815,302 | 9/1998 | McVey et al. . |

FOREIGN PATENT DOCUMENTS

| | | |
|---|---|---|
| 03099953 | 4/1991 | (JP) . |
| 09301073 | 11/1997 | (JP) . |
| 11011211 | 1/1999 | (JP) . |
| WO 87/06543 | 11/1987 | (WO) . |

* cited by examiner

*Primary Examiner*—Mohammad Sikder
(74) *Attorney, Agent, or Firm*—Ford Global Tech. Inc

(57) ABSTRACT

A vehicle image acquisition and display assembly 10 which is deployed within conventional vehicle rear-view mirror housing or shroud members 20, 22 and which selectively provides images of areas/regions and/or objects residing within the front and/or along the side of a vehicle 12.

13 Claims, 6 Drawing Sheets

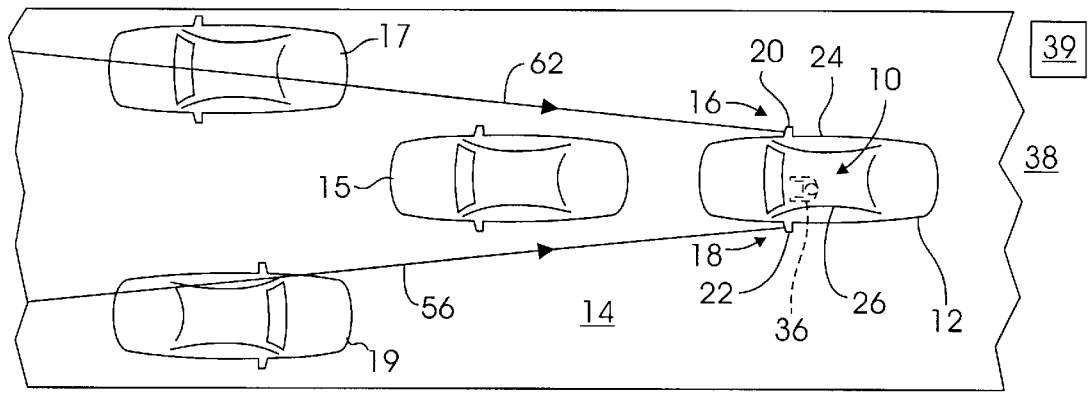
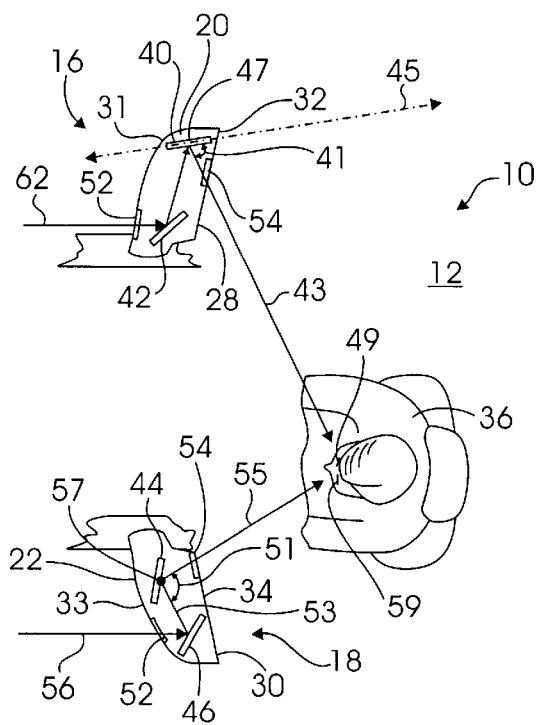
Fig. 1
Fig. 2

VEHICLE IMAGE ACQUISITION AND DISPLAY ASSEMBLY

FIELD OF THE INVENTION

This invention relates to a vehicle image acquisition and display assembly and more particularly, to an assembly which captures and provides images of areas and/or objects which are disposed in and/or toward the front and/or the side of a vehicle.

BACKGROUND OF THE INVENTION

It may be desirable to allow a user of a vehicle to view certain areas and/or objects which are located or disposed in the front and/or along the side of the vehicle, thereby allowing the user to gain additional images or information over that which is traditionally and/or typically provided by conventional vehicle "rear view" mirrors. This additional information may be useful in the navigation and/or operation of the vehicle.

Some attempts have been made to provide images of these frontal and/or side areas and/or objects. Particularly, these attempts include the use of one or more mirrors or image capture devices which are wholly disposed within the passenger compartment of the vehicle, the use of assemblies which are disposed and/or mounted upon the conventional rear-view mirror assemblies or "mirror-containment" members or shrouds, providing an arm or member having several image capture portions or apparatuses and which is selectively extendible from the side of the vehicle, and providing a selectively extendible periscope type assembly which is usually and selectively deployed and/or extended through the roof of the vehicle. While these attempts often provide desired images, they suffer from some drawbacks.

For example and without limitation, the assemblies which are wholly deployed within the vehicle and/or within the vehicle passenger compartment are often hidden from view or optically obstructed due to the placement of packages and/or other materials and individuals present in the vehicle. These obstructions substantially prevent these assemblies from properly operating and/or undesirably interfere with their operation.

The assemblies which are mounted upon the traditional rear-view mirrors are unaesthetic, frequently and undesirably engage car wash components, thereby causing damage to the components and to the vehicle, and present and/or display images having substantially identical display sizes in a "stacked manner" (e.g., the image of the front or side of the vehicle is presented "on top of" or "over" the image of the rear of the vehicle), thereby tending to confuse the driver or the operator of the vehicle and distracting the driver by requiring the driver to tilt his or her head to view the frontal and/or side images and/or requiring the driver to take his or her eyes "off of" the rear images.

The selectively extendible assemblies require linkages or members which are selectively extended from the side of the vehicle. These linkages or members require frequent repair or replacement due to the structural degradation that occurs and which is caused by various materials residing within and/or comprising the ambient environment that the vehicle resides within (e.g., road salt). These assemblies, when fully extended, also typically prevent the vehicle from traversing relatively "tight" passages, from traversing in close proximity to pedestrians, bicyclists, and/or other vehicles (e.g., such as when these devices are extended during a left-hand turn maneuver). These assemblies further require that the driver or operator of the vehicle remember to retract these assemblies when travelling in these "tight" passages, near other objects, and/or when making or completing a left-hand turn, or risk incurring substantial damage to the vehicle, causing other structural damage to other objects or vehicles, and/or injuring a pedestrian, bicyclist, or other individual. Further, these extended members undesirably create "drag" which adversely effects the overall performance of the vehicle and which causes the linked members to rotate with respect to each other, thereby potentially destroying the linked connection.

Lastly, the periscope approaches were and are of relatively limited use when the vehicle was or is behind a large truck or sports utility vehicle. Due to the proliferation of such relatively large sports utility vehicles, such periscope approaches are becoming even more undesirable. Moreover, such approaches create undesirable "drag" and potentially cause damage if these periscopes are not retracted by the vehicle owner or operator as the vehicle is traversing under a relatively short underpass or traversing a car wash.

It may therefore be desirable to provide an image acquisition and display assembly which selectively provides and displays images of areas and/or objects residing within the front and/or within the front and along the side portions of a vehicle and which overcomes the various drawbacks of such prior assemblies.

SUMMARY OF THE INVENTION

It is a first object of the present invention to provide a vehicle image acquisition and display assembly which overcomes some or all of the previously delineated disadvantages of such prior assemblies.

It is a second object of the present invention to provide a vehicle image acquisition and display assembly which overcomes some or all of the previously delineated disadvantages of such prior assemblies and which acquires and displays images of objects and/or regions residing within the front and/or along the side of the vehicle.

It is a third object of the present invention to provide a vehicle image acquisition and display assembly which overcomes some or all of the previously delineated disadvantages of such prior assemblies and which acquires and provides a first image of the rear of the vehicle and a second image of the front and/or of the side of the vehicle and which displays the second image substantially alongside the first image.

According to a first aspect of the present invention a mirror assembly for use with a vehicle is provided. The mirror assembly includes a generally hollow housing having a first open end portion and a second end portion; a first mirror which is movably disposed within the housing, which substantially covers the open end portion, which is constrained to only move within the housing, and which provides a first image; at least a second mirror which is disposed within the housing; a first member which is disposed within the housing and which is disposed alongside the first mirror; and a second member which is fixedly disposed within the second end portion, which communicates with the mirror assembly and which cooperates with the at least second mirror to provide a second image upon the first member.

According to a second aspect of the invention a method is provided for use within a vehicle of the type having a side portion and a rear-view mirror assembly which is disposed upon the side portion and which includes a housing containing a mirror. The method is adapted to provide images of an area residing within the front of the vehicle. The method includes the steps of providing an image acquisition assembly; wholly placing the image acquisition assembly within the rear view mirror assembly, effective to capture an image of the portion of the area residing within the front of the vehicle; and providing a display member which is communicatively coupled to the image acquisition assembly, which displays the image, and which abuttingly resides against the mirror, and which is wholly contained within the rear-view mirror assembly.

These and other features, aspects, and advantages of the invention will become apparent from a reading of the following detailed description of the preferred embodiment of the invention and by reference to the following drawings.

BRIEF DESCRIPTION OF THE DRAWINGS

FIG. 1 is a top view of a vehicle travelling upon a highway and including the image acquisition and display assembly of the preferred embodiment of the invention;

FIG. 2 is a top view of the driver of the vehicle which is shown in FIG. 1 and the image acquisition and display assembly of the preferred embodiment of the invention;

DETAILED DESCRIPTION OF THE PREFERRED EMBODIMENT OF THE INVENTION

Figure 3:
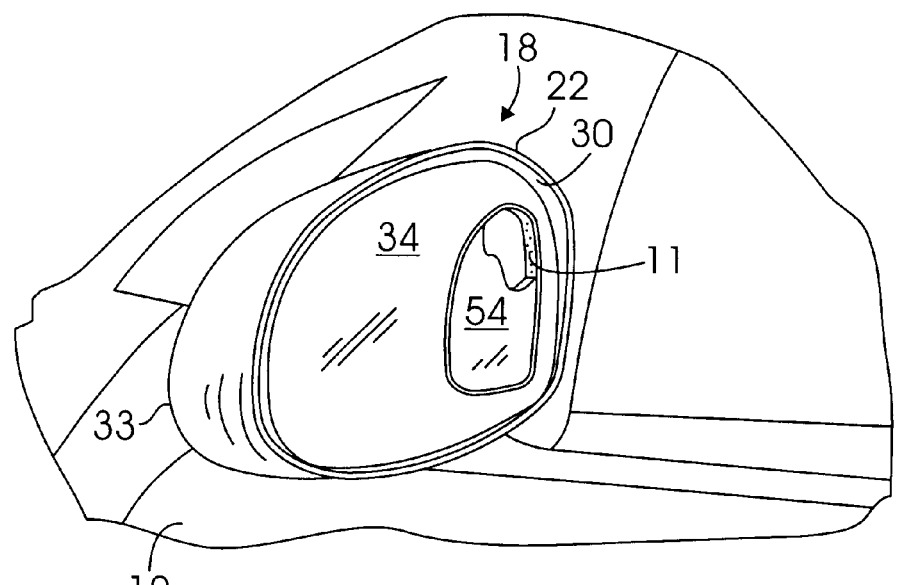
FIG. 3 is a perspective front view of one portion of the image acquisition and display assembly which is shown in FIGS. 1 and 2.

Referring now to FIGS. 1–4, there is shown an image acquisition and display assembly 10 which is made in accordance with the teachings of the preferred embodiment of the invention and which is operatively deployed upon and/or within a typical and conventional vehicle 12. As shown, vehicle 12 may selectively traverse or travel upon a convention highway or road 14 which contains other vehicles 15, 17, and 19. The image acquisition and display assembly, referred to as "the assembly" 10, includes first and second image capture/acquisition and display portions 16, 18 which are adapted to be housed and operatively contained within respective and typical or conventional vehicle rear-view mirror shrouds or containment members 20, 22.

Particularly, each shroud or containment member 20, 22 is generally and substantially hollow and is coupled or attached to respective side portions or a door 24, 26 of the vehicle 12. Further, each member 20, 22 has a respective and generally open end portion 28, 30 and a respective and opposed closed end portion and/or contoured opaque surface 31, 33. Each open end portion 28, 30 respectively receives a generally planar mirror 32, 34 which is used by the driver or operator 36 of vehicle 12 to view the area 38 and/or objects 39 which are located to the rear of or behind vehicle 12.

It should be appreciated that although mirrors 32, 34 are movably disposed within respective housings or shroud members 20, 22, they are constrained to only move within such respective housings or members 20, 22. Further, it should be appreciated that the shapes and the sizes of housings or shroud members 20, 22 and mirrors 32, 34 may vary from those shapes and sizes which are shown in the attached figures and that, in one non-limiting embodiment, mirrors 32, 34 comprise typical "rear-view" vehicle mirrors.

In this non-limiting embodiment, portion 16 includes first and second substantially identical, generally planar, and communicating mirrors 40, 42 which are wholly disposed within shroud member 20. Portion 18 similarly includes substantially identical, generally planar, and communicating mirrors 44, 46 which are wholly disposed within shroud member 22. It should be appreciated that mirrors 40, 42, 44, and 46 are substantially identical and may be contained within respective housing/shroud members 20, 22 by the use of conventional fasteners and/or adhesives. Further, in another embodiment of the invention, mirrors 40, 42 are physically connected to the conventional motor (not shown) which selectively moves mirror 32, while mirrors 44, 46 are physically connected to the motor (not shown) which selectively moves mirror 34. In this manner, mirrors 32, 40, 42 are selectively moveable within shroud member 20 but maintain their respective positions, as shown in FIG. 2, and mirrors 34, 44, and 46 are selectively movable within shroud member 22 but maintain their respective positions, as shown in FIG. 2.

In one non-limiting embodiment, an angle 41 exists between axis 43 and axis 45. Particularly, axis 43 lies between the center point 47 of mirror 40 and the right eye 49 of the user or driver 36 of the vehicle 12, when the driver or user 36 is in a seated and upright position and is about six feet tall. Axis 45 is the longitudinal axis of symmetry of mirror 40. In one non-limiting embodiment, the angle 41 has a value of about 70°. Similarly, an angle 51 is formed between axis 53 and axis 55. Particularly, axis 55 lies between the center point 57 of the mirror 44 and the left eye 59 of the user 36 when the user is in a seated and upright position and is about six feet tall. Axis 55 emanates from center point 57 of mirror 44 and forms an angle of about 45° with respect to the longitudinal axis of symmetry of the mirror 44. In one non-limiting embodiment, the angle 51 has a value of about 90°.

Figure 4:
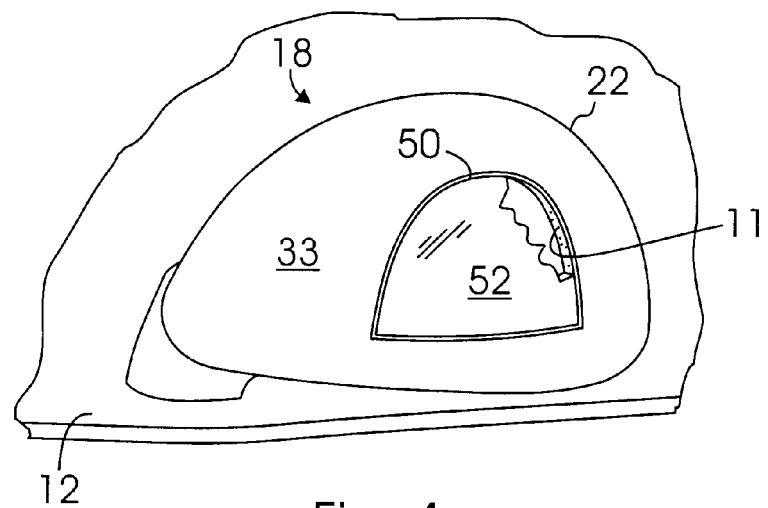
FIG. 4 is a perspective back view of the portion of the image acquisition and display assembly which is shown in FIG. 3.

As shown best in FIGS. 3 and 4, closed end portion or contoured surface 33 includes or has an aperture 50 over and/or into which a substantially transparent member 52 is removably fixed while maintaining the relatively smooth texture and continuous surface of closed end portion 33. Further, portion 18 includes a substantially transparent member 54 which may be formed within the mirror 34 or disposed and/or placed within shroud member 22 in an abutting, coplanar, or "side by side" relationship to the mirror 34 (e.g., a portion of the mirror 34 is removed and portion 54 is made to substantially and wholly replace the removed portion). The sizes and shapes of members 52, 54 may change from those shown in the figures but, in the most preferred embodiment of the invention, the shape of member 54 is dissimilar to the shape of mirror 34 and member 54 is coplanar to the mirror 34. Hence, the image provided by mirror 34 has a substantially different shape and size than does the image provided by member 54. In one nonlimiting embodiment, members 52 and 54 are each respectively attached to shroud 22 and mirror 34 by use of a conventional and commercially available "glue" or another type of adhesive material 11 which also substantially prevents water or other ambient contaminants from entering the interior portions of members 20, 22. It should be realized that portion 16 is substantially similar to portion 18 (e.g., member 20 includes substantially identical members or portions 52, 54 which have been delineated above).

In operation, light rays 56, representing images from the left front or left side of the vehicle 12 (e.g., from the front or side of the driver 36), impinge upon member 52 of portion 18, are communicated to mirror 46, are thereafter reflectively communicated to mirror 44, and then are communicated to the user/operator 36 by use of and/or through member 54. In this manner, the user/operator 36 of vehicle 12 gains images or information associated with regions/areas and/or objects residing within the front and/or alongside the traveling vehicle 12. Light rays 62, representing images from the right front or right side of the vehicle 12 (e.g., from the front or side of the passenger of vehicle 12), impinge upon member 52 of portion 16 and are communicated to mirrors 42, 40, and then are communicated to the user/operator 36 by use of and/or through member 54 of portion 16. In this manner, the driver/operator 36 gains image information associated with or representing objects residing within and/or alongside the right side of the vehicle 12 (e.g., residing within the front or along the side of the "front seat" passenger position).

In the previously delineated manner, the driver/operator 36 gains information concerning the front and/or the frontal side portions of the vehicle 12 and the information is presented in a "side by side" or coplanar format relative to the information provided by the rear-view mirrors 32, 34, thereby allowing the user/operator/driver 36 to quickly obtain all of the information which is desired to be viewed, without requiring the driver 36 to tilt or move his or her head or eyes or to otherwise be undesirably distracted (e.g., the frontal/side and rear images may be concomitantly viewed by the driver 36). Further, the use of dissimilar shapes and sizes of the displayed substantially coplanar images (e.g., the "rear view" images are substantially longer and of a different shape than the frontal/side view images) also reduces operator or driver confusion.

Figure 5:
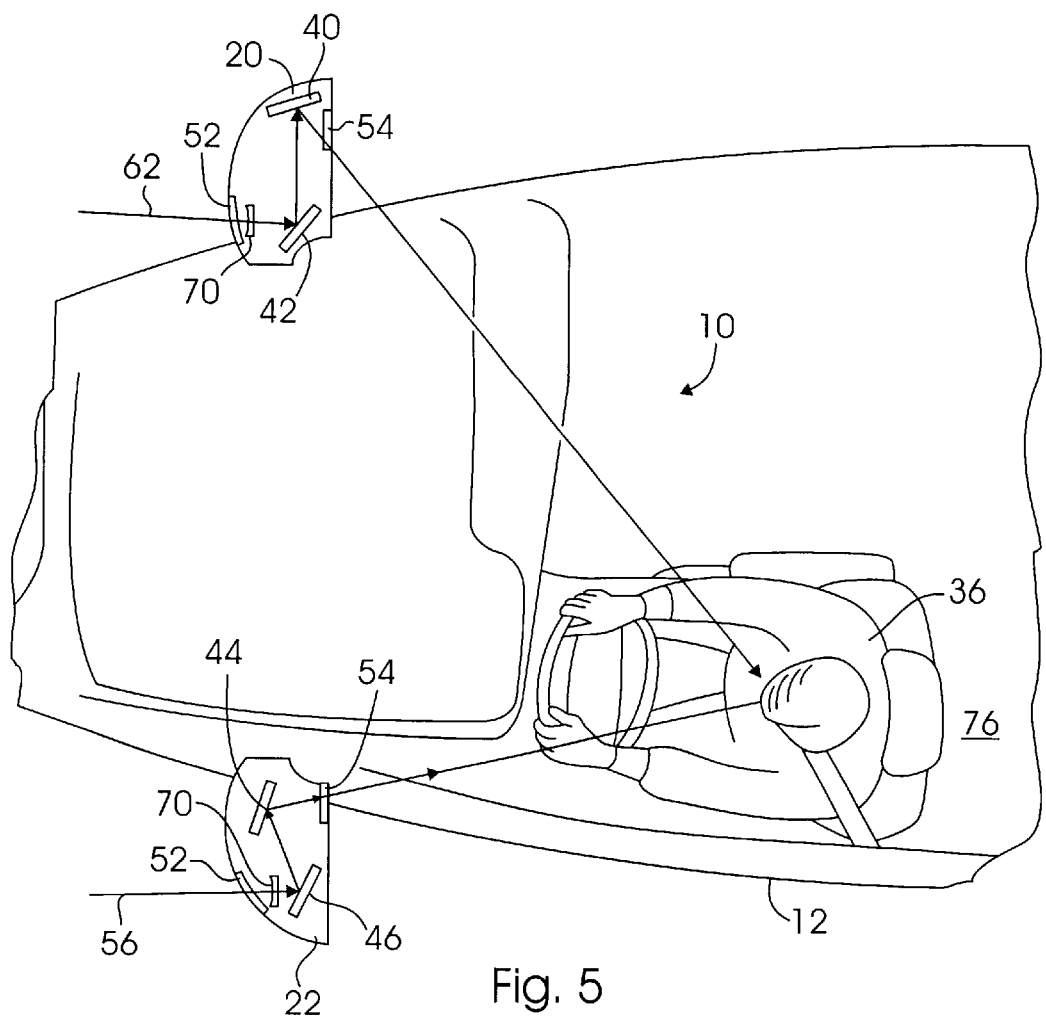
FIG. 5 is a top view of an image acquisition and display assembly which is made in accordance with the teachings of a second embodiment of the invention and which is operatively deployed upon and/or within the vehicle shown in FIG. 1.

In an alternative embodiment of the invention, as best shown in FIG. 5, a concave lens 70 is placed in each of the shroud members 20, 22. Particularly, each of the concave lenses 70 are adapted to receive a unique one of the light rays 56, 62 and to respectively communicate the captured image data to a unique one of the mirrors 42, 46. The use of such concave lenses 70 allows the provided frontal and/or side images to be relatively well-defined and substantially undistorted. The concave lenses 70 may, in yet another non-limiting embodiment of the invention, be alternatively adapted to each receive image data emanating from a unique one of the mirrors 42, 44 and to communicate the received image data to the user or operator 36 through a unique one of the members or portions 54. Each lens 70 may also be coupled to a unique one of the motors which respectively allow the mirrors 32, 40, 42 and the mirrors 34, 44, 46 to move, thereby substantially ensuring the maintenance of the relative and respective positions of each of the lenses 70 with respect to the mirrors 32, 40, 42 and to the mirrors 34, 44, and 46. Further, it should be appreciated that shroud members 20, 22 may include other types of image acquisition and display assemblies other than those which have been described.

Figure 6:
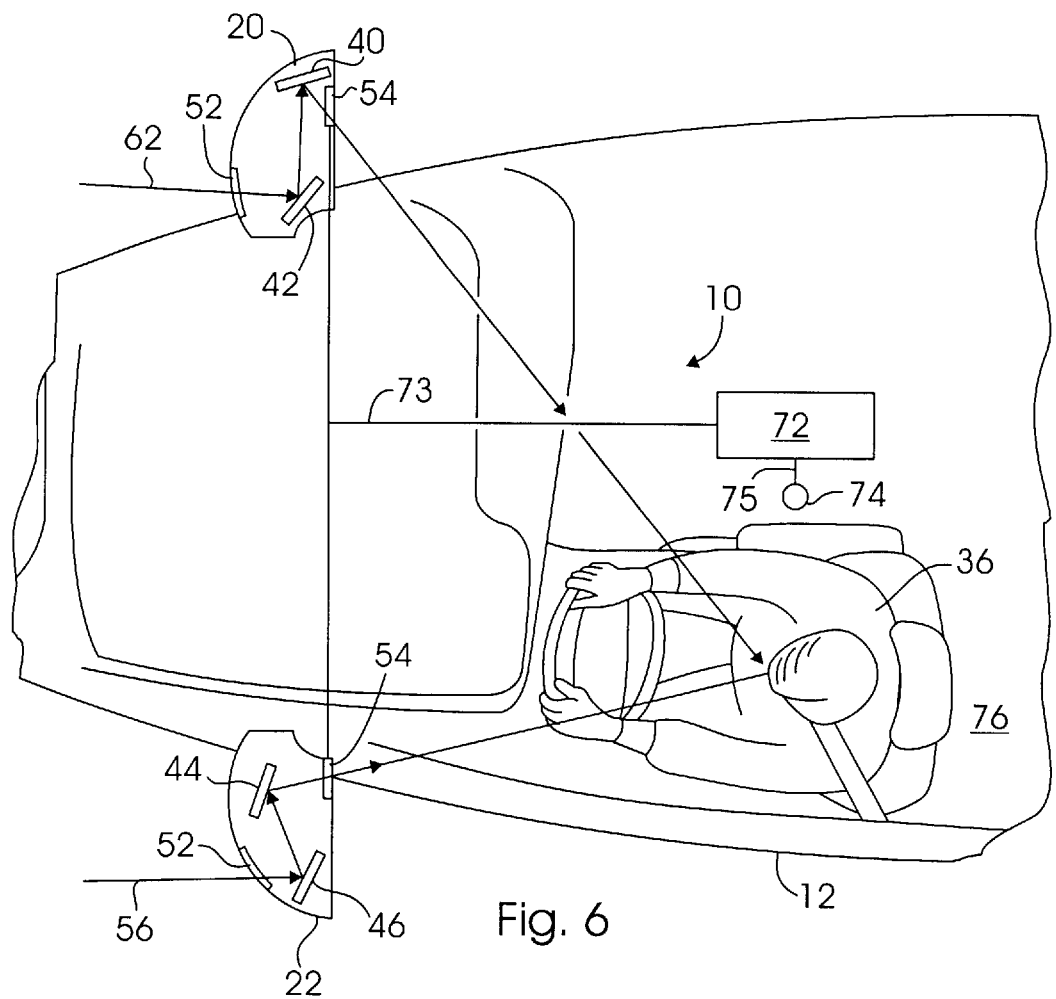
FIG. 6 is a top view of an image acquisition and display assembly which is made in accordance with the teachings of a third embodiment of the invention and which is operatively deployed upon and/or within the vehicle shown in FIG. 1.

In yet another non-limiting embodiment of the invention which is best shown in the FIG. 6, portions 54 each comprise and/or are formed from an electrochromic material. In this non-limiting embodiment, assembly 10 includes a controller 72 which is operable under stored program control and which is electrically and physically coupled to portions 54 by bus 73. A switch 74 is selectively placed within the passenger compartment 76 of the vehicle 12 and is physically and electrically coupled to the controller 72 by bus 75. In this manner, the user/operator 36, by a depression or activation of switch 74, causes the controller 72 to generate an electrical signal, upon bus 73, which selectively causes each of the portions 54 to become opaque or to provide frontal and/or side type images in the previously delineated manner. In this manner, the user/operator 36 may select the type of images which are desired to be viewed and, more particularly, may manually prevent frontal and/or side type image data from being presented upon each of the portions 54 during times when such images are not needed.

Figure 7:
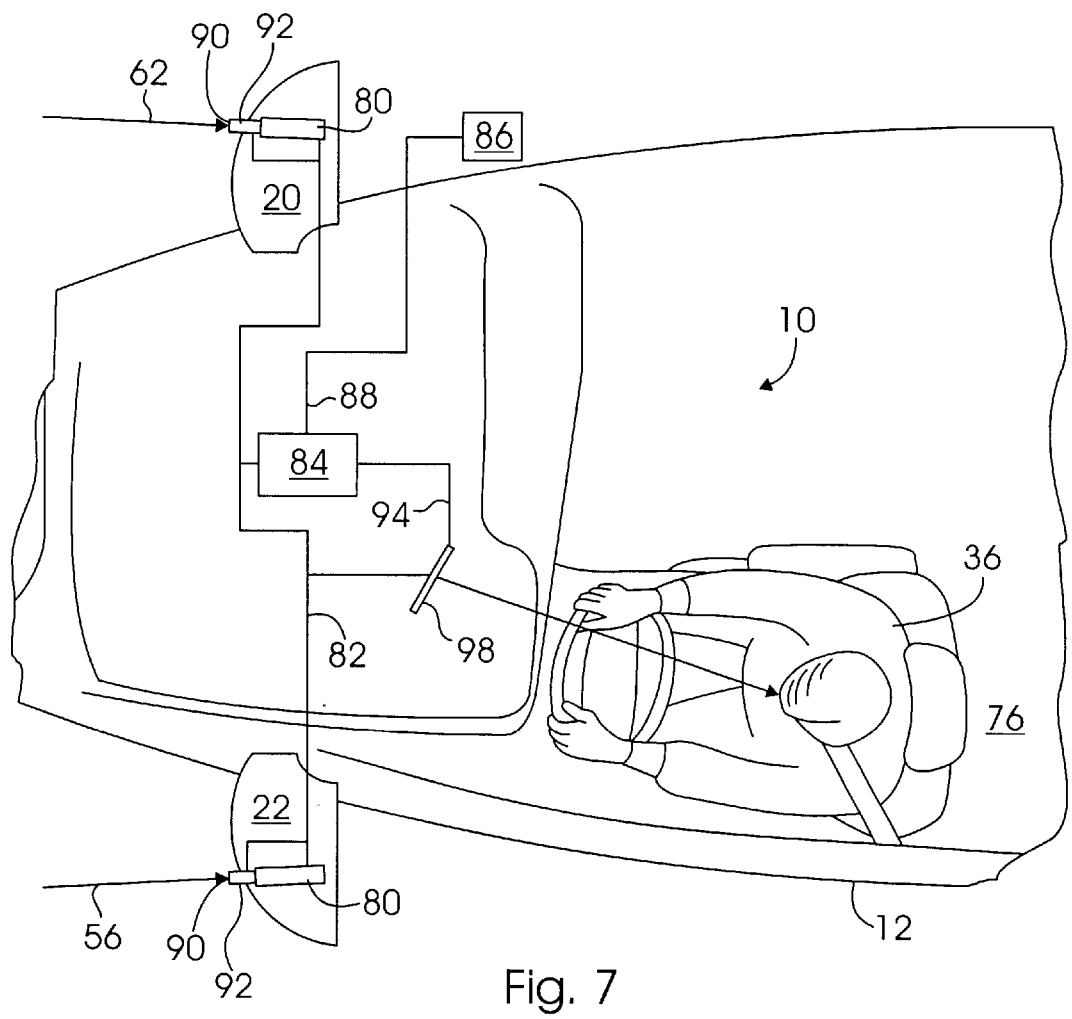
FIG. 7 is a top view of an image acquisition and display assembly which is made in accordance with the teachings of a fourth embodiment of the invention and which is operatively deployed upon and/or within the vehicle of FIG. 1.
Figure 8:
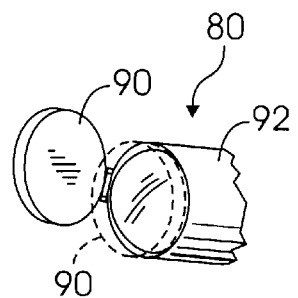
FIG. 8 is a perspective side view of the lens of the camera which is shown in FIG. 7.

Yet another alternate embodiment of the invention is shown in FIGS. 7 and 8. In this alternate embodiment, assembly 10 includes a camera 80 which is placed within each of the shroud members 20, 22 and which is directed to the front of the vehicle. The cameras 80, by use of bus 82, are physically and electrically coupled to a controller 84 which operates under stored program control and which resides within vehicle 12. Moreover, assembly 10, in this alternate embodiment of the invention, includes one or more sensors 86, such as a temperature or precipitation type sensor, which are physically and electrically coupled to the controller 84 by use of bus 88. Further, as shown best in FIG. 8, each camera 80 includes a selectively movable member 90 and a motor (not shown) which allows member 90 to be movable, in response to a signal emanating from controller 84 and placed on bus 82. Particularly, member 90 is selectively movable from a first position in which the member 90 protectably overlays the camera lens 92 (shown in phantom in FIG. 8), to a second remote position in which the camera lens 92 is uncovered and operable.

Figure 9:
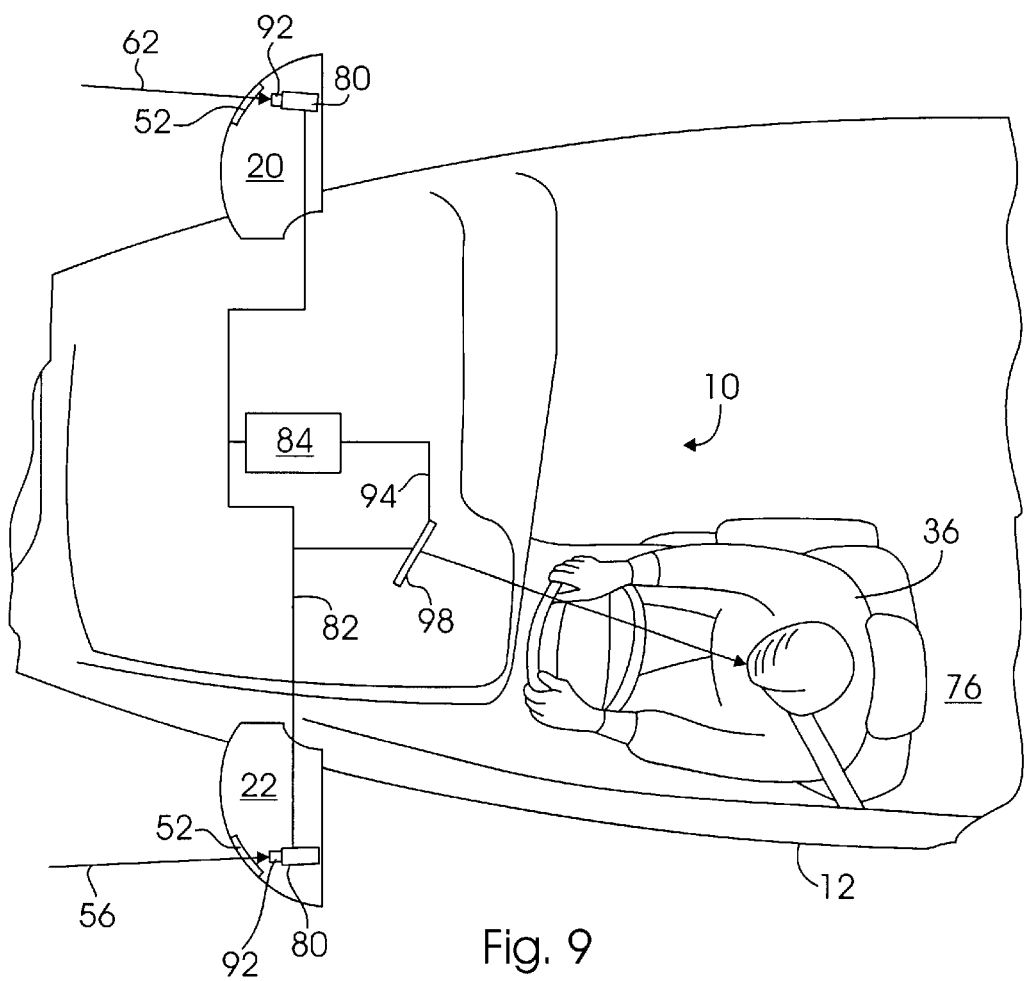
FIG. 9 is a top view of an image acquisition and display assembly which is made in accordance with the teachings of a fifth embodiment of the invention and which is operatively deployed upon and/or within the vehicle of FIG. 1.

In this manner, controller 84 may protect lens 92 by causing member 90 to overlay lens 92 when sensor(s) 86 detects precipitation, weather, and/or other ambient conditions and/or materials which may damage the lens 92. This arrangement also allows the lens 92 to be protected when camera 80 is not in use. Assembly 10 also includes a display assembly 98 (such as a conventional "heads up" display) which is disposed within the passenger compartment 76 of the vehicle 12 and which is communicatively and physically coupled to the cameras 80 and to the controller 84 by respective busses 82 and 94. In this manner, cameras 80 cooperatively provide frontal and/or side images to the display 92 unless the controller 84 deactivates the cameras 80. In another alternate embodiment, each camera 80 may be wholly disposed within a unique one of the shroud members 20, 22, as shown best by FIG. 9, and each respective lens 92 is operatively deployed behind a unique one of the members 52.

It is understood that the invention is not to be limited to the exact construction and method which has been previously described, but that various changes may be made without departing from the spirit and the scope of the invention.

Moreover, it should be appreciated that by placement of the image acquisition and display portions 16, 18 within conventional rear-view mirror shrouds 20, 22, an overall aesthetically pleasing appearance and protection from degradation caused by the ambient environment is provided. Further, assembly 10 obviates the need for the vehicle operator/user 36 to remember to retract the assembly 10 when the vehicle 12 enters a car wash, low overpass, or a "tight" passage, and substantially prevents the formation of undesirable drag. Further, assembly 10 provides images of the rear and the front/side of the vehicle in a substantially co-planar, abutting, "side by side" format and further provides for each of the displayed images to be of a different size, thereby further reducing operator confusion. The placement of the image acquisition and display portions 16, 18 within members 20, 22 also substantially prevent interference with the operation of assembly 10 by packages and/or individuals residing within vehicle 12. Hence, assembly 10 provides many advantages over prior vehicle image acquisition and display assemblies.

What is claimed is:

1. A mirror assembly for use with a vehicle having an operator, said mirror assembly comprising:

a generally hollow housing having a first open end portion and a second end portion;

a first mirror which is movably disposed within said housing, which substantially covers said first open end portion, which is constrained to only move within said housing, and which provides a first image;

at least a second mirror which is disposed within said housing;

a first member which is disposed within said housing and which is disposed co-planar to and alongside said first mirror, thereby causing said first mirror and said first member to face said operator; and a second member which is fixedly disposed within said second end portion, which communicates with said at least second mirror and which cooperates with said at least second mirror to provide a second image upon said first member.

2. The mirror assembly of claim 1 wherein said first member comprises electrochromatic material.

3. The mirror assembly of claim 2 wherein said first mirror comprises a rear-view mirror.

4. The mirror assembly of claim 3 wherein said housing comprises a rear-view mirror housing.

5. The mirror assembly of claim 4 wherein said second member is transparent.

6. The mirror assembly of claim 5 wherein said at least second mirror comprises a pair of substantially identical planar mirrors.

7. The mirror assembly of claim 6 further comprising a concave lens which is wholly disposed within said housing and which is communicatively coupled to said pair of substantially identical planar mirrors.

8. The mirror assembly of claim 2 further comprising a controller which receives certain data and which, in response to said receipt of said certain data, causes said first member to be opaque.

9. The mirror assembly of claim 8 wherein said certain data is generated by use of a switch which resides within said vehicle.

10. The mirror assembly of claim 6 wherein said second image comprises an image of an area in front of said vehicle.

11. The mirror assembly of claim 6 wherein an object resides in front of said vehicle and wherein said second image comprises an image of said object.

12. The mirror assembly of claim 10 wherein said first image is larger than said second image.

13. The mirror assembly of claim 1 wherein said at least said second mirror is movably disposed within said housing.

* * * * *